Jan. 19, 1926.                                                   1,569,958
J. C. FREIDHOFF
RELIGIOUS AUTOMATA
Filed Nov. 1, 1922
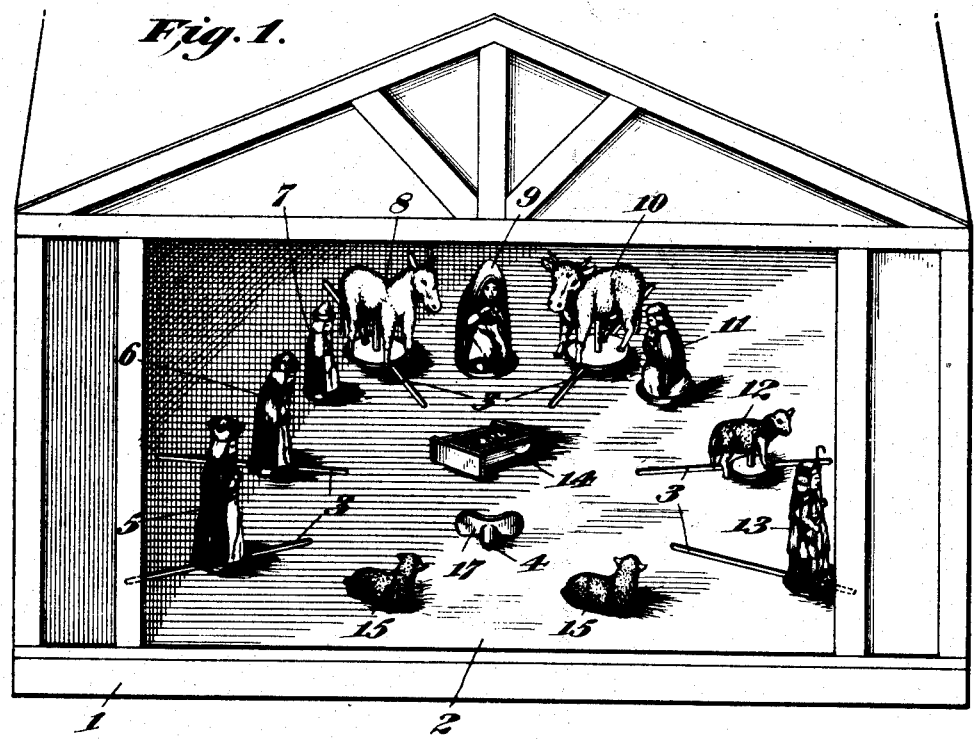
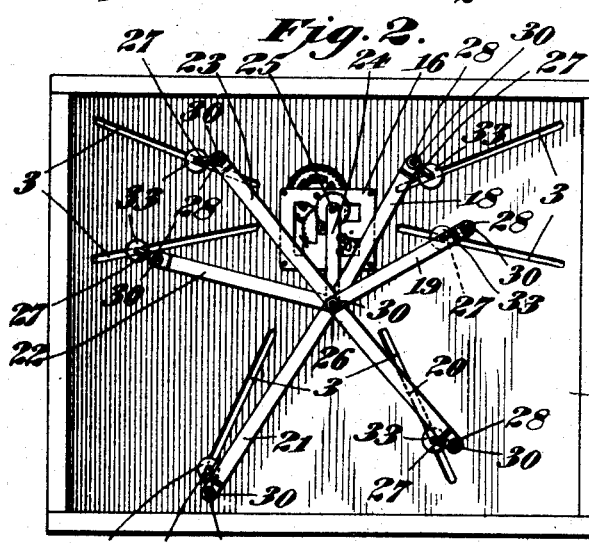
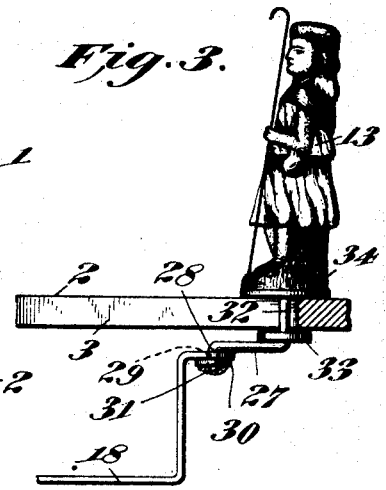
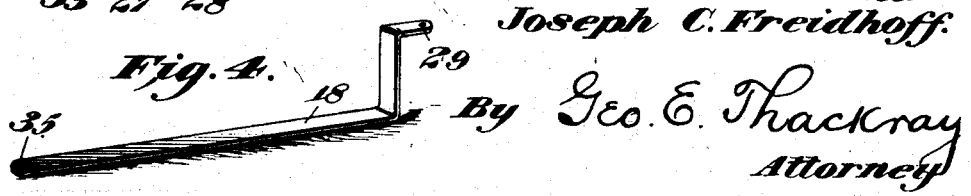
Inventor
Joseph C. Freidhoff
By Geo. E. Thackray
Attorney Patented Jan. 19, 1926.

1,569,958

UNITED STATES PATENT OFFICE.

JOSEPH C. FREIDHOFF, OF JOHNSTOWN, PENNSYLVANIA.

RELIGIOUS AUTOMATA.

Application filed November 1, 1922. Serial No. 598,303.

*To all whom it may concern:*

Be it known that I, JOSEPH C. FREIDHOFF, a citizen of the United States, and a resident of the city of Johnstown, in the county of Cambria and State of Pennsylvania, have invented certain new and useful Improvements in Religious Automata, and do hereby declare the following to be a full, clear, and exact description of the invention, such as will enable others skilled in the art to which it appertains to make and use the same.

My invention relates to a group of mechanically moved figures, representing living beings or religious automata, and in the form illustrated herein it is of the latter-named type, illustrating the Christ Child, His attendants and surroundings in the stable, where He was born. Certain of the persons and animals are adapted to move toward and from the Child in the cradle, and are operated by a spring actuated clock mechanism with cranks, connecting rods and guides, in such a way that each of them turns one-half way around at the end of his travel, so that as each figure approaches the cradle he does so in a forward position with his eyes directed toward the Child, and as he moves away he first turns about one-half way around and then moves in a natural forward manner. This movement is accomplished by a spring driven clock movement or other suitable mechanism, which is adapted to rotate a crank, and to this crank are pivotally attached a number of connecting rods or pitmans, one of which is connected to each of the moving figures. Each of the moving figures is mounted on a shaft or pivot which projects through a slot in the floor, which guides it and determines the directions of its movement of translation, and each of these shafts or pivots is provided with a crank portion formed preferably integral therewith, which crank extends frontwardly from the forward portion of the figure with the crank pin portion directly in front of the figure. To each of the moving figures a pitman is connected, which is pivotally mounted on the crank of the figure and the other end of each pitman is pivotally mounted on the crank of the main driving crank. The driving crank is rotated by means of a clock or other suitable mechanism, provided with spring, winding key, etc.

Having thus given a general description of my invention, I will now, in order to make the matter more clear, refer to the annexed sheet of drawings, which forms part of this specification, and in which like characters refer to like parts:—

Figure 1 is a front perspective view of my invention as seen by the usual observer; Figure 2 is a bottom plan view of my device; Figure 3 is a detailed enlarged view of one of the moving figures and part of the mechanism for operating it, and Figure 4 is a detailed perspective view of one of the main connecting rods or pitmans.

Referring now to the characters of reference on the drawings:—1 represents the structure of the stable in general, 2 is the floor or platform thereof provided with a number of slots 3 therein approximately radiating from the cradle; 4 is a hole through the floor to receive the winding shaft of the clock mechanism, which is wound in the usual manner by the key 17. Various characters can be used in my invention as will be readily understood, but those shown are two wise men 5 and 6, which are adapted to move, and another wise man 7, who is stationary. 8 is a jackass adapted to move, 9 is Mary in a stationary kneeling position, 10 is a cow adapted to move and to further assist in the representation of a stable, 11 is Joseph in a stationary position, 12 is a sheep or lamb adapted to move, 13 is a shepherd with his crook, also adapted to move; 14 is the Christ Child lying in the cradle, and 15 are two lambs fixed and lying down. The clock work is generally indicated as 16, and this is provided with a rotatable shaft 25 having a crank arm 24 secured thereto, having a pivot 26, on which are pivotally mounted the inner arms of the various connecting rods or pitmans 18, 19, 20, 21, 22 and 23, these being six in number, corresponding with the moving figures and the equal number of slots 3, which guide their movement. Each of the moving figures is provided with a shaft or pivot 32 firmly secured thereto, the lower end of which forms the crank arm 27 with the bent end 28, which forms the crank pin thereof. One of the connecting rods or pitmans has one end pivotally mounted on each of these crank pins and its other end pivotally mounted on the driving crank pin 26 of the driving crank 24 and its ends rotatably secured by means of the washers 30 and the solder or nuts 31. The main pitmans or connecting rods are provided with holes 29 at one end to fit on the crank pins 28 and with holes 35 at their other ends to rotatably fit on the main crank pin 26 of the driving crank 24. Disks or washers 33 are also provided, mounted on the shafts 32 to hold the figures in position, and each of the moving figures is secured on a larger disk 34, on which it is mounted, and this disk may also be secured to the shaft 32.

It should be noted that the clock motion is arranged intermediate of the group of figures, but is preferably at a distance from the center of the group, so that the different figures move at various times, and the lengths of the connecting rods also vary, so that the different position and movements of the various figures lends variety to the action. The figures may represent living beings, such as persons, or animals, and the floor on which they are mounted may be considered as a platform, which is hollow below in order to receive the driving mechanism and at the same time cover or conceal it from sight when in operation.

The operation of my invention is as follows:—The figures being in the positions illustrated in Figure 1, the clock mechanism is wound up by means of the key 17, and this causes the crank arm 24 to rotate and the crank pin 26 thereof to move in a circle, the diameter of the circle being approximately equal to the length of or slightly less than the length of each of the slots 3. The figures are so arranged on the disks 34 so that when they are at the farther ends of their strokes, presenting their backs to the cradle, the crank arms 27 extend directly away from said cradle. As the movement of the pitmans continues this first rotates the crank arms 27 about one-half turn, which therefore causes the figures to turn and face the cradle, and the continuation of the movement of the pitmans then pulls the figures toward the cradle to the limit of the stroke and near the inner ends of the slots, while the continued movement of the connecting rod again reverses the position of the figures, so that each then partially rotates and turns its back upon the cradle and moves away from the same in a natural forward position. It will be thus seen that the moving figures when approaching the cradle face toward it and when moving away they move in a very natural forward position, having both a movement of translation backward and forward in the slots and a movement of rotation of about 180 degrees or so at each end of the slots.

Although I have shown and described my invention in considerable detail, I do not wish to be limited to the exact and specific details thereof, as shown and described, but may use such modifications in, substitutions for, or equivalents thereof as are embraced within the scope of my invention or as pointed out in the claims.

Having thus described my invention, what I claim and desire to secure by Letters Patent is:—

1. In an automaton, a floor provided with a slot therein, a figure mounted over said slot provided with a crank secured thereto and extending below the floor, a pitman pivotally connected to said crank, and a motor operated crank connected to the opposite end of said pitman; whereby the figure will be moved backward and forward along the slot and reversed at the end of each linear movement to face in the direction of the succeeding linear movement.

2. In an automaton, a floor having a slot therein, a figure representing a living being mounted over said slot, a shaft firmly secured to said figure extending downwardly through said slot and provided with a crank arm, a pitman, one end of which is pivotally secured to said crank arm a motor below the floor having a crank arm connected to the other end of said pitman; whereby the figure will be moved backward and forward along the slot and reversed at the end of each linear movement to face in the direction of the succeeding linear movement.

3. In an automaton, a platform, the image of a Child located on an intermediate portion of said platform, a plurality of slots in the platform approximately radiating from said Child, statue-like representations of living beings mounted over said slots and each provided with a shaft firmly secured thereto extending downwardly through one of said slots, each shaft having a crank arm extending forwardly of said being, connecting rods having one end pivotally secured to the pin ends of said crank arms, and a motor having a crank arm connected to the other ends of said connecting rods; whereby the several figures are moved automatically toward and from the Child and reversed at the end of each linear movement to face in the direction of the succeeding linear movement.

4. In an automaton, a floor or platform, a slot extending therethrough, a representation of a living being mounted over said slot, a shaft secured to said being and extending downwardly through said slot and provided with an integrally formed crank arm and pin, a connecting rod, one end of which is pivotally mounted on said crank pin and secured thereon by means of a washer and holding means, a clock movement, a crank operated thereby and engaging the other end of said connecting rod; whereby the figure is moved backward and forward along the slot and reversed at the end of each linear movement to face in the direction of the succeeding linear movement.

5. An automaton of the character described, comprising a floor, a Child lying in a cradle on an intermediate portion of said floor, a plurality of slots extending through said floor and radiating from said Child, a representation of a living being mounted over each slot and secured to a disk bottom, a shaft secured to said disk bottom and extending downwardly through said slot having a crank arm with a pin formed integrally therewith, said crank arm extending in a forward direction of said being, connecting rods, secured to said crank pins, a clock movement or other driving mechanism, the shaft of which is arranged at a predetermined distance from the center of the group of figures, and a crank operated by said clock movement and engaging the other ends of said connecting rods; whereby the several figures are moved automatically toward and from the Child and reversed at the end of each linear movement to face in the direction of the succeeding linear movement.

In witness whereof I hereunto affix my signature.

JOSEPH C. FREIDHOFF.